(12) United States Patent
Van Camp

(10) Patent No.: US 7,068,994 B2
(45) Date of Patent: Jun. 27, 2006

(54) METHODS AND APPARATUS FOR COMMUNICATION

(75) Inventor: R. Allen Van Camp, Ortonville, MI (US)

(73) Assignee: Ciliko Wireless Incorporated, Clarkson, MI (US)

( * ) Notice: Subject to any disclaimer, the term of this patent is extended or adjusted under 35 U.S.C. 154(b) by 82 days.

(21) Appl. No.: 10/637,987

(22) Filed: Aug. 8, 2003

(65) Prior Publication Data

US 2005/0032504 A1 Feb. 10, 2005

(51) Int. Cl.
*H04M 11/04* (2006.01)
(52) U.S. Cl. .............................. 455/404.2; 455/404.1; 455/456.1
(58) Field of Classification Search ............. 455/404.2, 455/414.2, 433, 456.1, 456.2, 456.3, 456.5, 455/456.6, 457
See application file for complete search history.

(56) References Cited

U.S. PATENT DOCUMENTS

| 5,418,537 | A | * | 5/1995 | Bird ....................... 342/357.09 |
| 5,848,373 | A | * | 12/1998 | DeLorme et al. ...... 340/995.26 |
| 6,172,640 | B1 | | 1/2001 | Durst et al. |
| 6,236,358 | B1 | | 5/2001 | Durst et al. |
| 6,421,001 | B1 | | 7/2002 | Durst et al. |
| 6,748,223 | B1 | * | 6/2004 | Fraccaroli ................ 455/456.1 |
| 6,836,653 | B1 | * | 12/2004 | Kang ......................... 455/408 |
| 2005/0070305 | A1 | * | 3/2005 | Krasner et al. .......... 455/456.1 |

* cited by examiner

*Primary Examiner*—George Eng
*Assistant Examiner*—Sam Bhattacharya
(74) *Attorney, Agent, or Firm*—Mintz, Levin, Cohn, Ferris, Glovsky and Popeo, P.C.

(57) ABSTRACT

A communication system according to various aspects of the present invention comprises one or more remote units. The communication system may also include at least one communication center. The remote units may also be configured to communicate with each other. The communication center and/or the remote unit may be configured to determine the location of another remote unit.

6 Claims, 15 Drawing Sheets

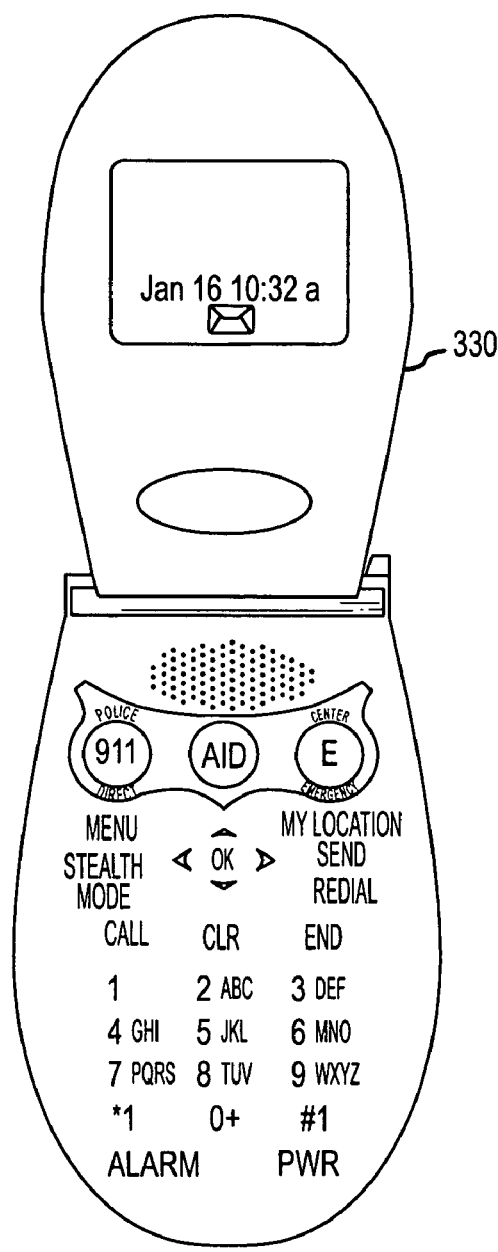
FIG.3B
FIG.3C

METHODS AND APPARATUS FOR COMMUNICATION

FIELD OF THE INVENTION

The invention relates to methods and apparatus for communication.

BACKGROUND OF THE INVENTION

Communications systems, especially personal communications systems, have recently developed dramatically. The popularization of cellular telephones and the Internet have contributed to better, faster, more reliable, and more cost effective technologies. Current cellular telephones are tiny compared to their predecessors, and provide much more powerful applications and services.

Despite the availability of many applications, current communication systems are still largely limited to voice communication functions. Communications between cellular telephones or other devices typically comprise ordinary voice communications. In an emergency, cellular telephone users contact local authorities, such as by dialing 9-1-1. To locate another person, such as a family member in a time of emergency, the caller dials the person's cellular telephone number to contact the person and talk about the person's location. If the person does not answer, however, the caller must ordinarily wait for a return call or try again. Similarly, for operations utilizing remote personnel, such as technical field forces or sales forces, locations are typically determined by regularly contacting a central office. In the absence of ordinary voice communication, however, the central office may not be able to establish the location of the various personnel.

SUMMARY OF THE INVENTION

A communication system according to various aspects of the present invention comprises one or more remote units. The communication system may also include at least one communication center. The remote units may be configured to communicate with the communication center. The remote units may also be configured to communicate with each other. The communication center and/or the remote units are suitably configured to determine the location of another remote unit.

BRIEF DESCRIPTION OF THE DRAWING FIGURES

A more complete understanding of the present invention may be derived by referring to the detailed description when considered in connection with the following illustrative figures. In the following figures, like reference numbers refer to similar elements and steps.

Figure 4:
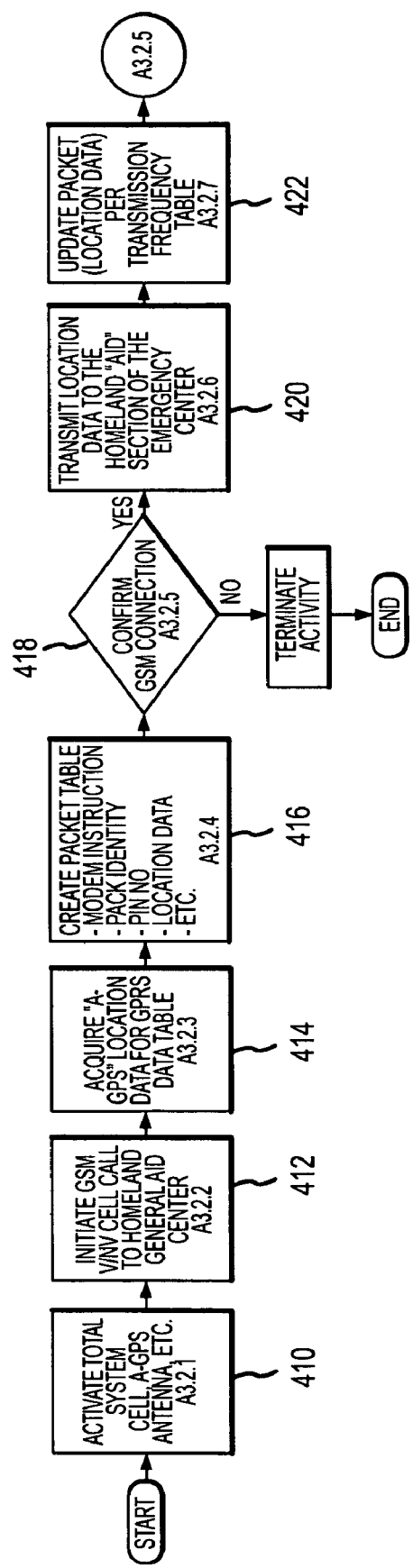
Figure 5:
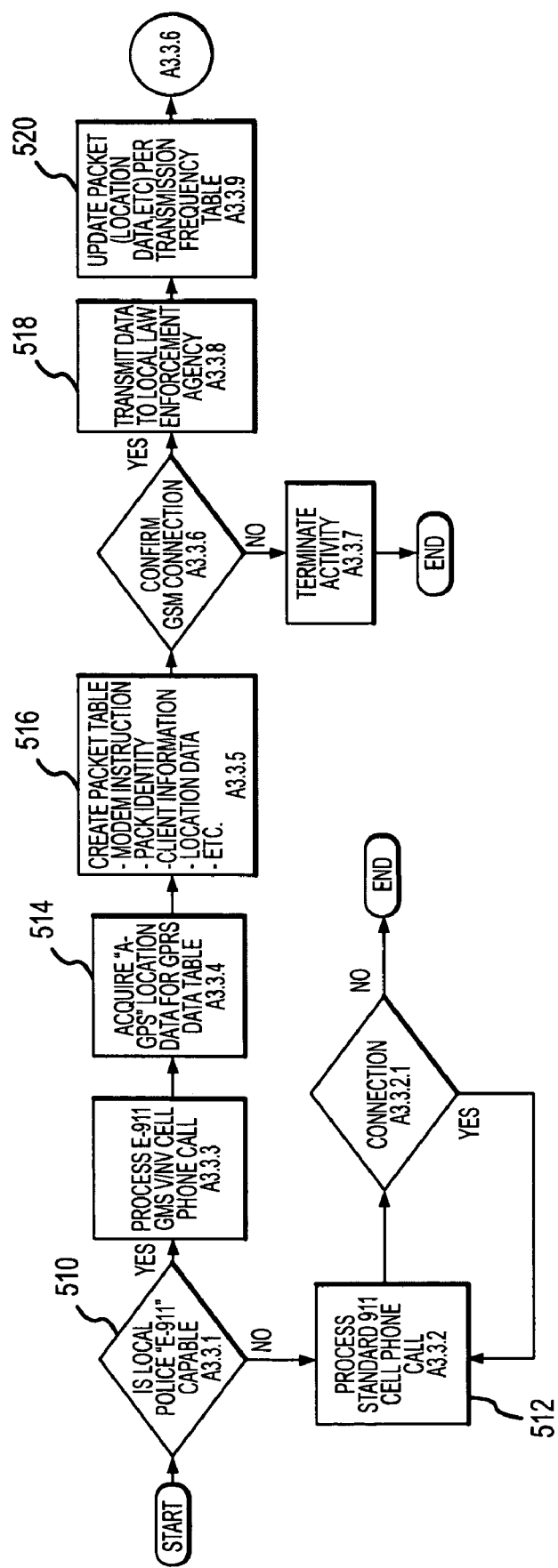
Figure 6:
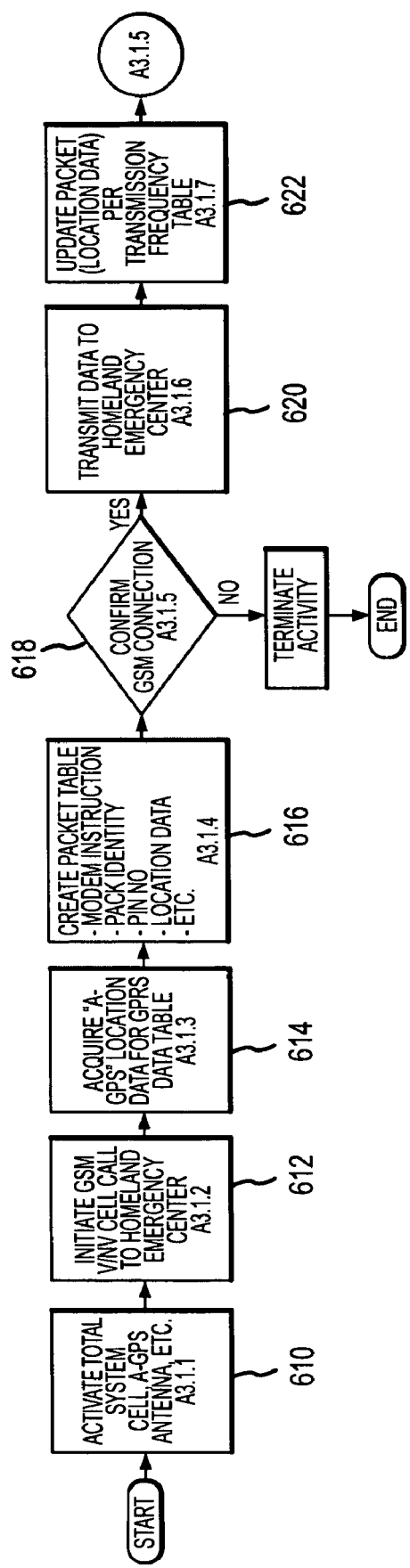
Figure 7:
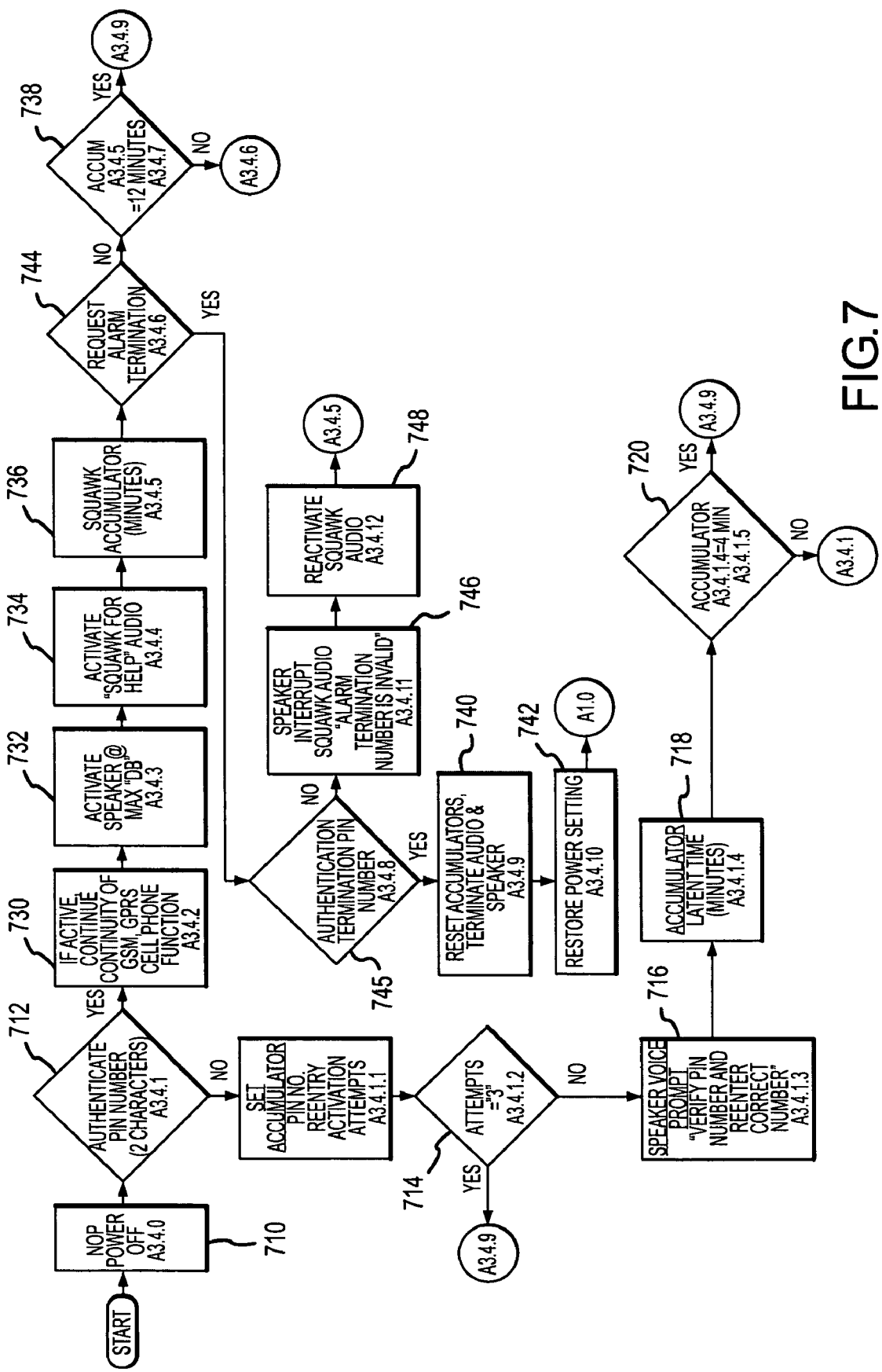
Figure 8A:
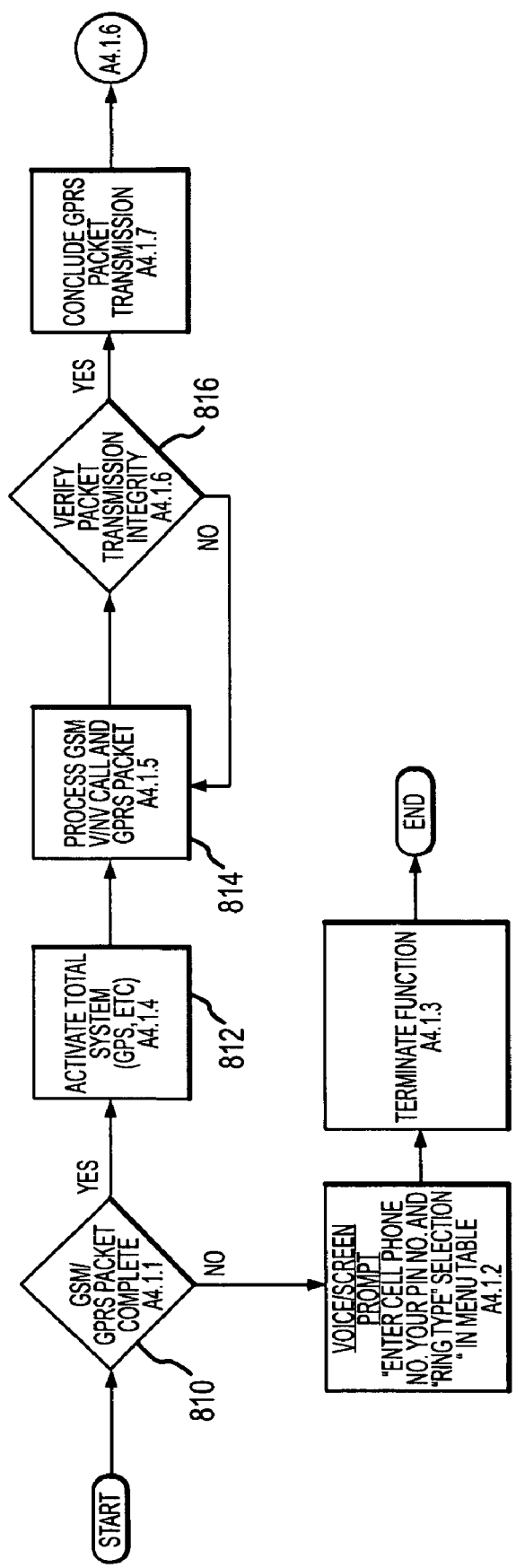
Figure 8B:
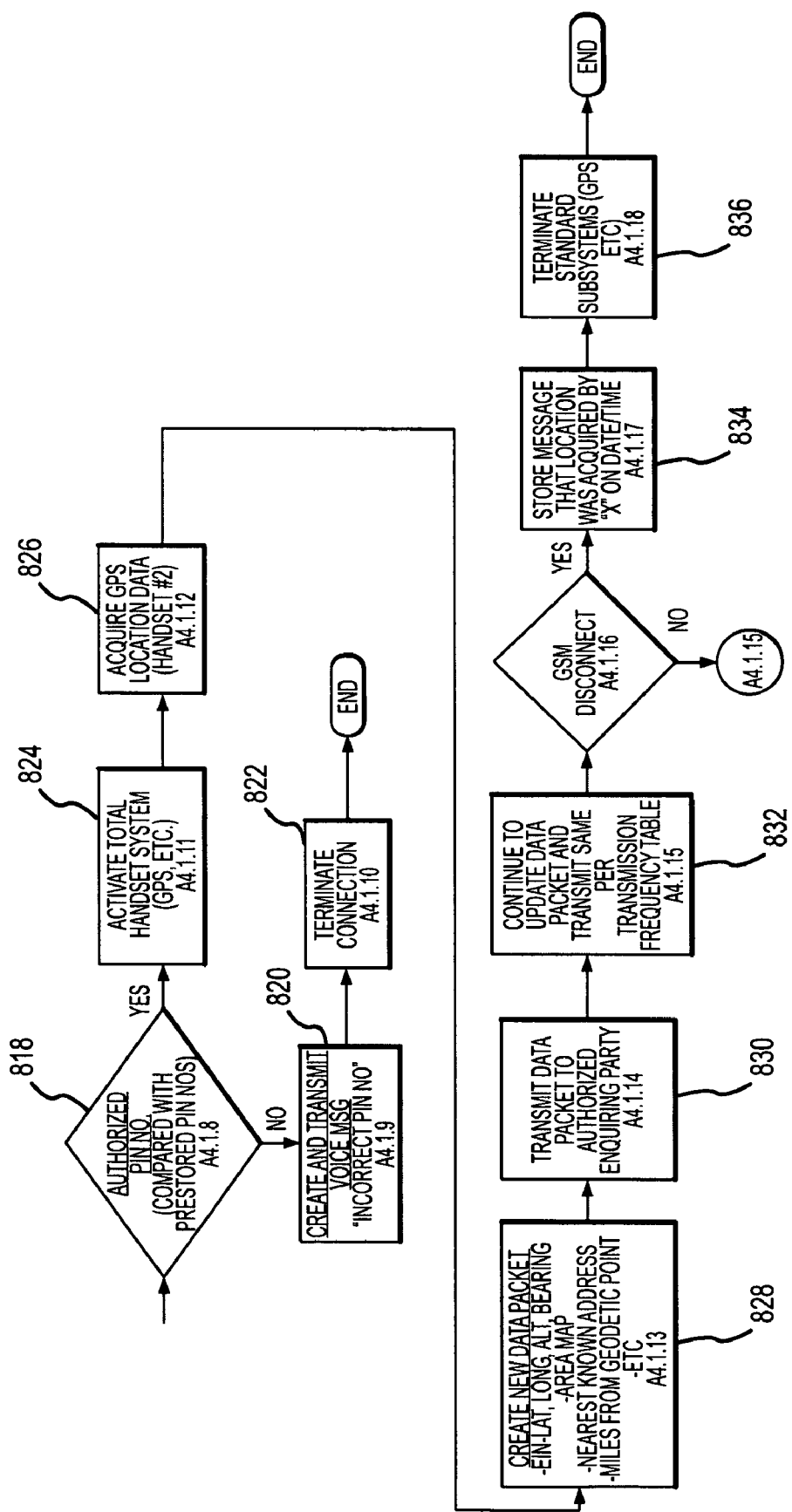
Figure 8C:
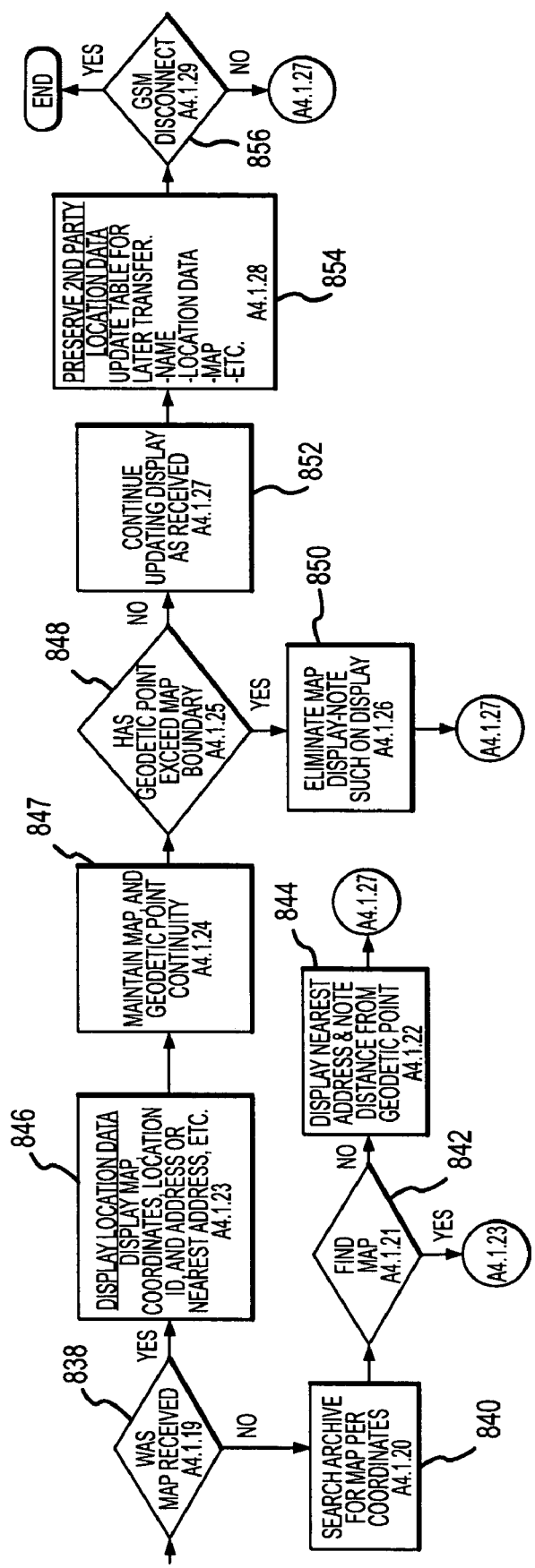
Figure 9A:
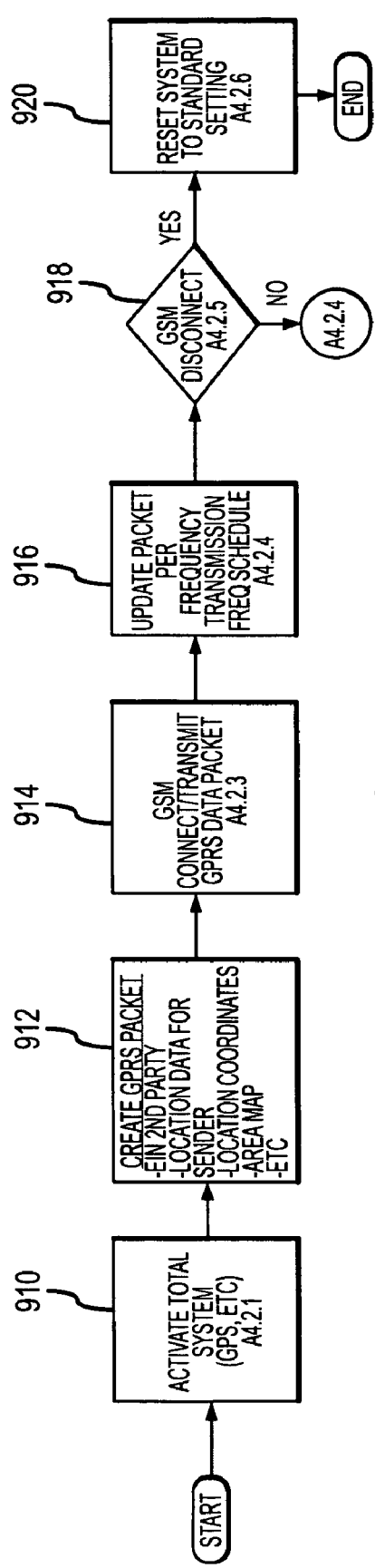
Figure 9B:
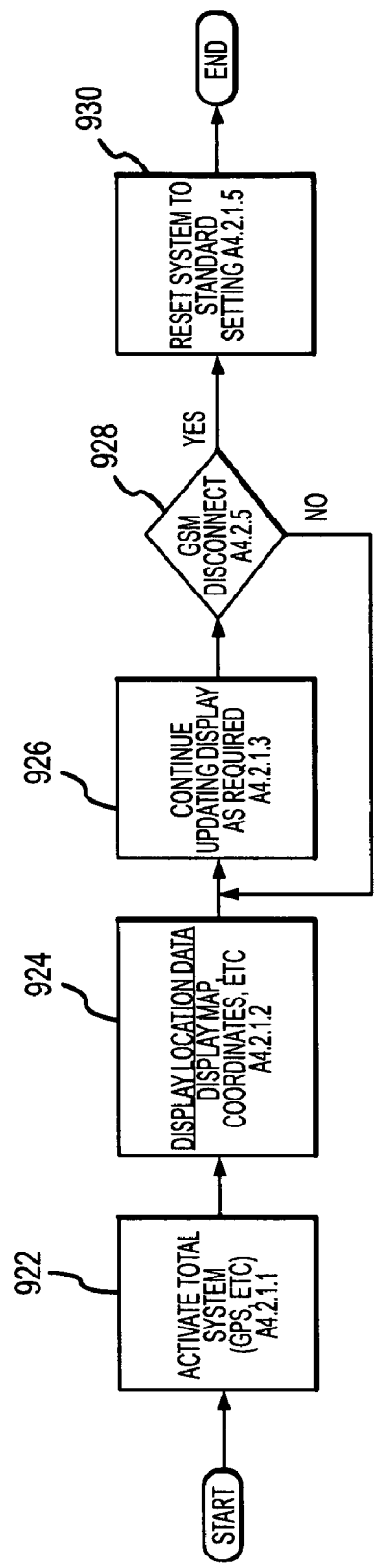
Figure 10A:
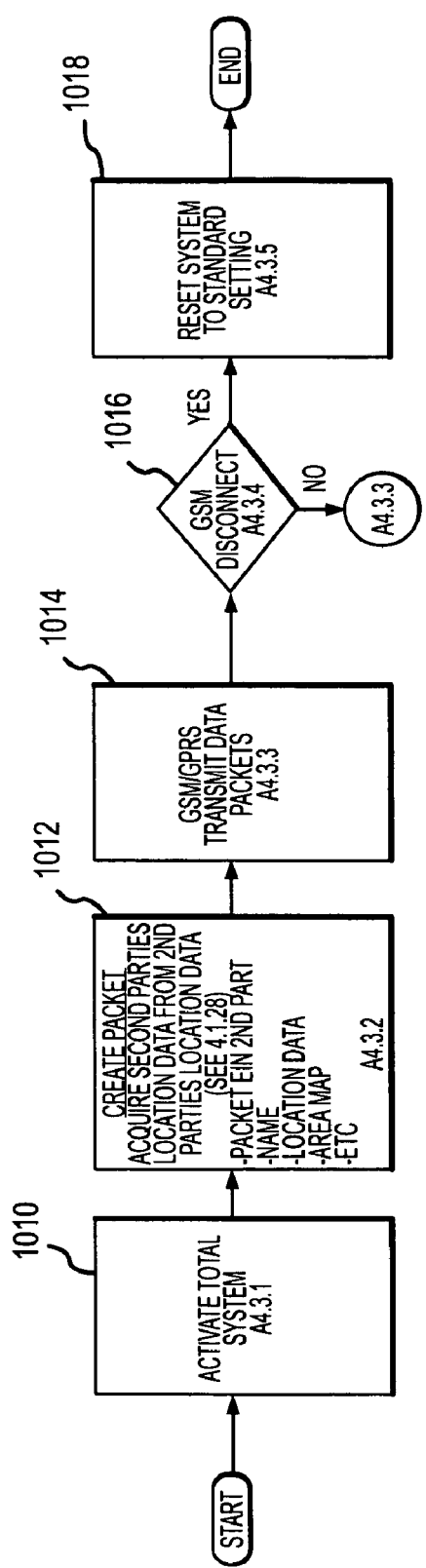
Figure 10B:
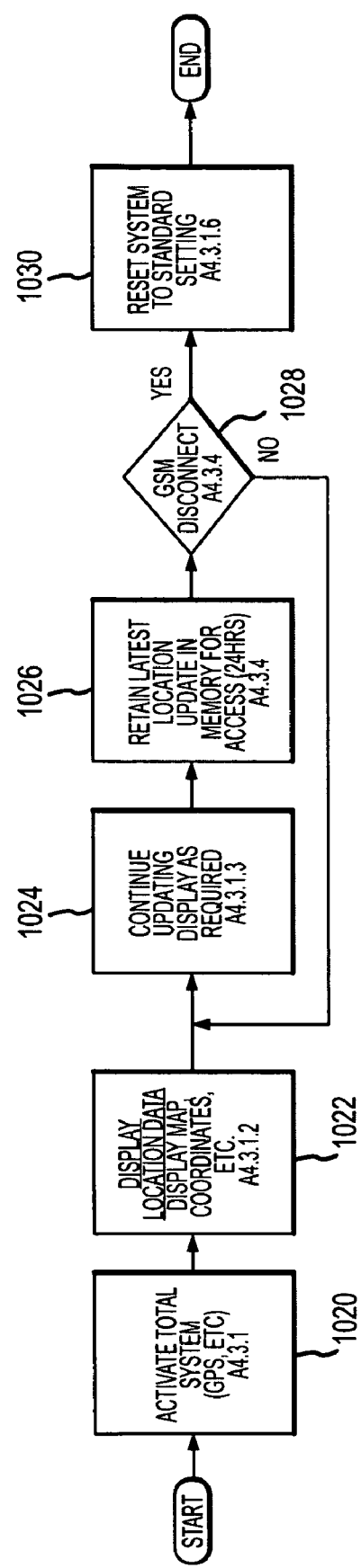
Figure 11:
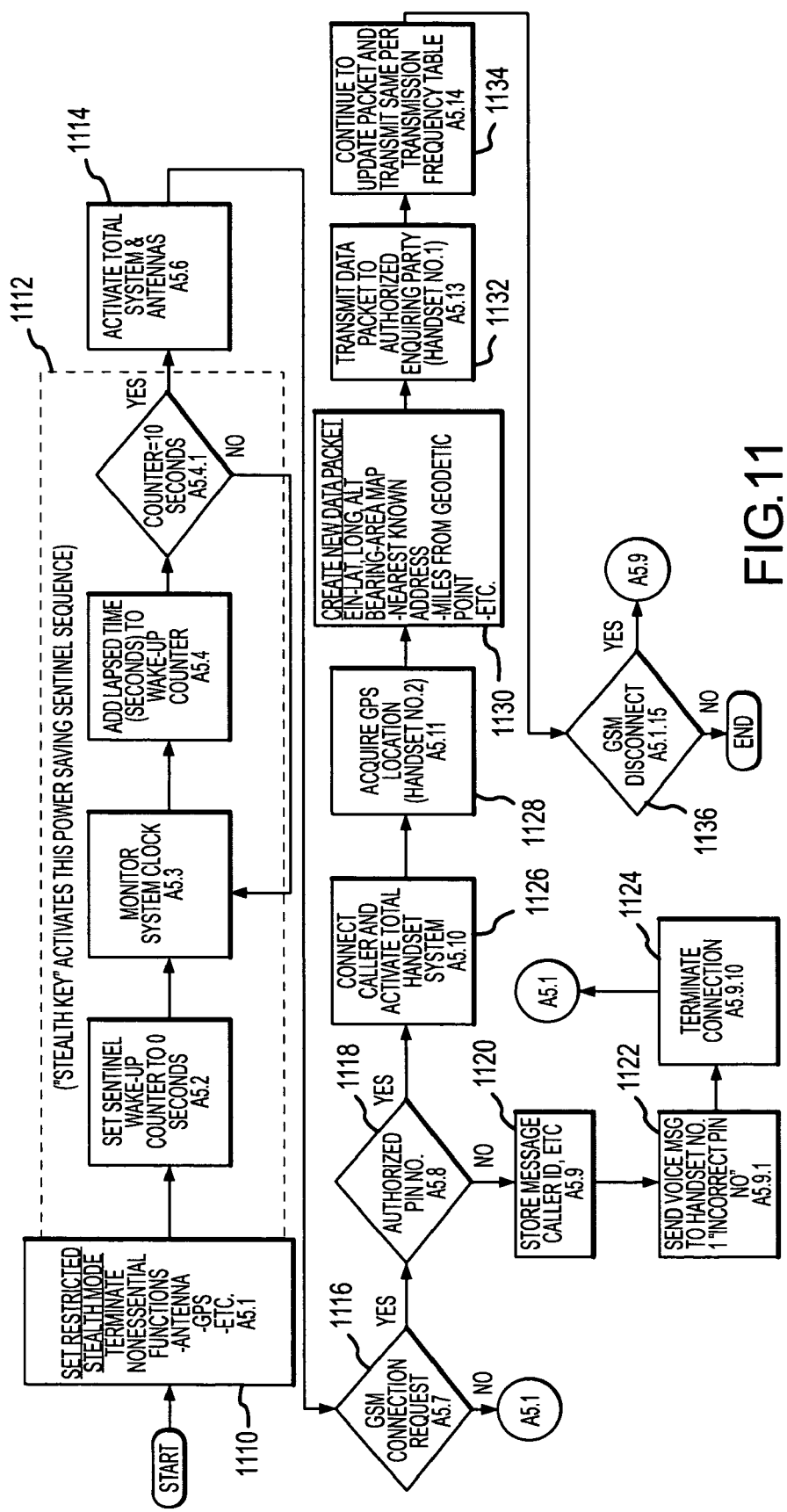

FIGS. 3A–E are illustrations of various remote units;

FIG. 4 is a flow diagram of a general service process;

FIG. 5 is a flow diagram of an emergency law enforcement assistance request process;

FIG. 6 is a flow diagram of a emergency assistance request process;

FIG. 7 is a flow diagram of an alarm process;

FIGS. 8A–C are a flow diagram of a locate remote unit process;

FIGS. 9A–B are a flow diagram of a send remote unit location process;

FIGS. 10A–B are a flow diagram of a process for sending a remote unit's location to a third party; and FIG. 11 is a flow diagram for a process for determining the location of a remote unit in monitoring mode.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention is described partly in terms of functional components and various processing steps. Such functional components may be realized by any number of components configured to perform the specified functions and achieve the various results. For example, the present invention may employ various elements, materials, communication systems, positioning systems, control systems, user interfaces, and the like, which may carry out a variety of functions. In addition, the present invention may be practiced in conjunction with any number of applications, environments, communication hierarchies and organizations, and levels of implementation, and the systems described are merely exemplary applications for the invention. Further, the present invention may employ any number of conventional techniques for manufacturing, assembling, communicating, and the like.

Figure 1:
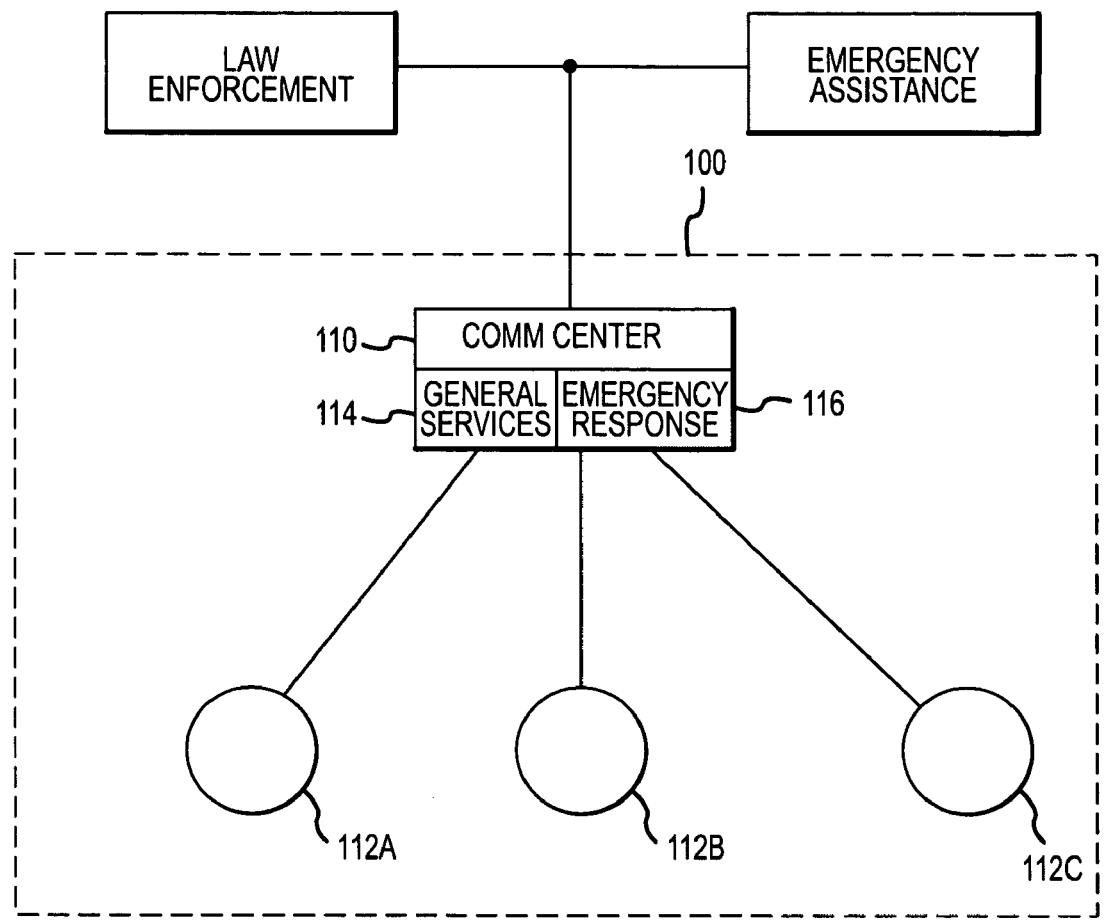
FIG. 1 is a block diagram of a communication system according to various aspects of the present invention.

Referring now to FIG. 1, a communication system 100 according to various aspects of the present invention may be implemented in conjunction with a communication center 110 and one or more remote units 112A–C. The communication center 110 communicates with and provides services to the remote units 112, such as general assistance and emergency assistance. The remote units may communicate with the communication center 110, other remote units 112, and other communications systems, such as telephones, computer networks, and positioning systems.

The communication center 110 may comprise any suitable operation for communicating with the remote units 112 and providing relevant services to the remote units 112, such as providing dispatching orders, receiving job completion information, providing contact information, addresses, or directions, connecting remote units 112 to other remote units 112 or communication systems, dispatching assistance, providing database access, or alerting government authorities. For example, the communication center 110 may provide general assistance and emergency assistance services. The communication system 100 may include multiple service centers 110 which may be interconnected or independent. In various embodiments, a particular metropolitan area may be serviced by one or more service centers 110, a single communication center 110 may provide services to an entire nation, or a major communication center 110 may supervise the provision of services by other lower level service centers 110 in other areas. The service centers 110 and the services provided may be configured in any suitable manner according to any appropriate criteria, such as geography, availability of communications, needs for particular services, and the like.

In the present embodiment, the communication center 110 comprises a general services center 114 and an emergency response center 116. The general services center 114 provides non-emergency assistance, such as directory assistance, directions to requested locations, technical support, hospitality information, or dispatching non-emergency roadside assistance. The emergency response center 116 responds to emergency requests and notifications, such as notifying law enforcement 102, requesting emergency medical or fire control assistance 104, alerting government authorities, providing advice and assistance, and the like.

The communication center 110 may be configured in any appropriate manner to provide the relevant services. For example, the communication center 110 may include personnel and systems for responding to anticipated emergencies, such as robberies, kidnappings, medical emergencies, bomb threats, fires, and the like. The communication center 110 may also have access to individual information, such as biographies, medical information, and emergency contact information for subscribers, as well as general databases, such as maps, emergency contact information for a particular area, and the like.

The communication center 110 provides information and assistance to users of the remote units 112. The remote units 112 may be connected to the communication center 110 and/or other systems via any appropriate medium, such as analog or digital radio frequency (RF) communications. In the present embodiment, the remote units 112 are connected to the services center 110 and other systems, such as conventional telephone systems, by cellular communications. In particular, the remote units 112 suitably operate as conventional cellular telephones, as well as perform additional functions.

Figure 2:
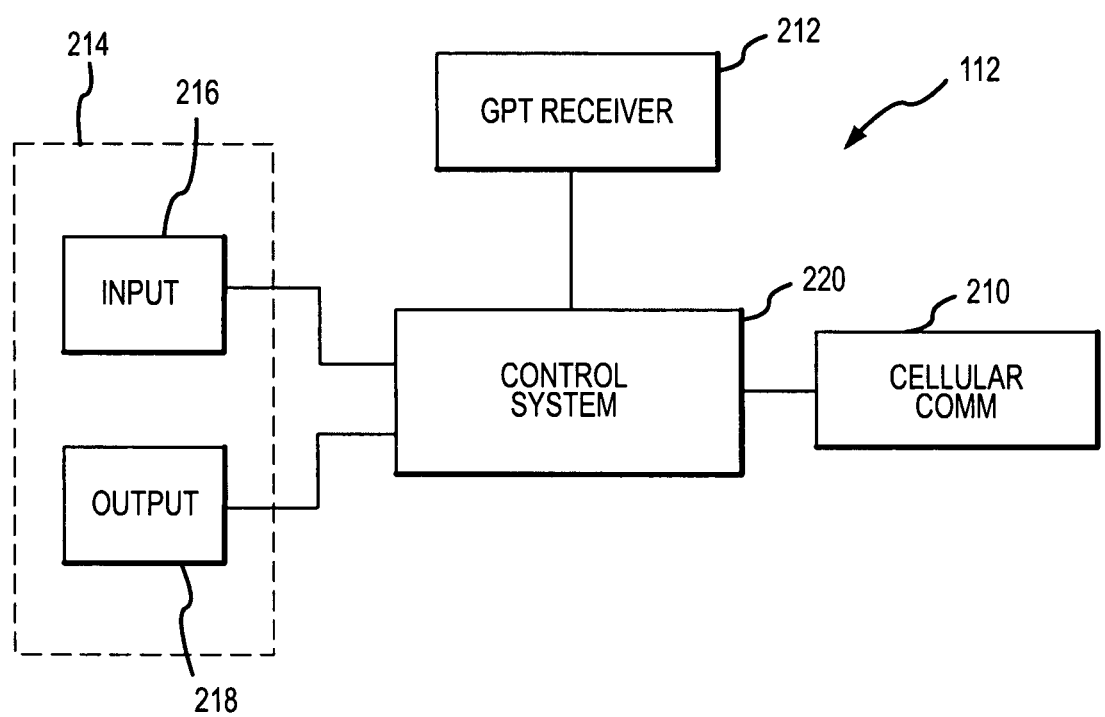
FIG. 2 is a block diagram of a remote unit.

The remote units 112 may be configured in any suitable manner according to the functions to be performed by the particular remote unit 112. For example, referring to FIG. 2, a remote unit 112 suitably comprises a remote communication system 210, a positioning system 212, a user interface 214 comprising an input interface 216 and an output interface 218, and a control system 220. The remote communication system 210 facilitates communication with the communication center 110 and other systems, and the positioning system 212 determines the position of the remote unit 112. The user interface 214 facilitates the exchange of information between the remote unit 112 and the user, and the control system 220 controls the overall operation of the remote unit 112.

More particularly, the control system 220 implements various functions in accordance with data received from the communications system 210, the positioning system 212, and the user interface 214. The control system 220 may comprise any suitable system for controlling the remote unit 112, such as a microprocessor, microcontroller, a logic system, or any other suitable system for controlling the operation of the remote unit 112. In addition, the control system 220 may be integrated or embedded into another system, such as the positioning system 212 and/or the remote communication system 210.

The remote communication system 210 facilitates communication between the remote unit 112 and other systems. The remote communication system 210 may comprise any appropriate system for facilitating communication with other systems. In the present embodiment, the remote communication system 210 comprises a cellular communication chipset, such as a GSM or CDMA chipset. In addition, the remote communication system 210 suitably facilitates communication of digital data, such as in conjunction with a packet-based system like a General Packet Radio Service (GPRS). The remote communication system 210 may also facilitate communication of other forms of data, such as video data and the like, or other communication systems, such as satellite communications.

The positioning system 212 facilitates determination of the position of the remote unit 112. The positioning system 212 may comprise any suitable system for determining the position of the remote unit 112, such as a global positioning system receiver. In the present embodiment, the positioning system 212 comprises a Motorola MG4100 instant GPS chip. The positioning system 212 may also or alternatively be separate from the remote unit 112. For example, the positioning system may comprise a triangulation system at the communication center 110 or elsewhere that determines the approximate location of the remote unit 112 by location pattern matching or according to the strength of or arrival time for the remote unit 112 signals relative to various cellular stations. The positioning system 212 may be located at any suitable location and may be implemented in any appropriate manner to determine the location of the remote unit 112.

The user interface 214 facilitates interaction between the user and the remote unit 112. The user interface 214 may comprise any appropriate system, suitably comprising an input interface 216 and an output interface 218. The input interface 216 receives information from the user, such as voice data, digital data, instructions, and the like. The input interface 216 may comprise any appropriate system for receiving information from the user, such as a microphone, a keypad, a voice recognition system, buttons, switches, dials, and the like. Similarly, the output interface 218 provides information from the remote unit 112 to the user, and may be configured in any suitable manner to provide information to the user. For example, the output interface 218 may comprise a speaker, an earpiece, a display, and the like. In addition, the input interface 216 and the output interface 218 may be fully or partially integrated, for example using a touch-screen display for both displaying information and receiving input signals.

Figure 3A:
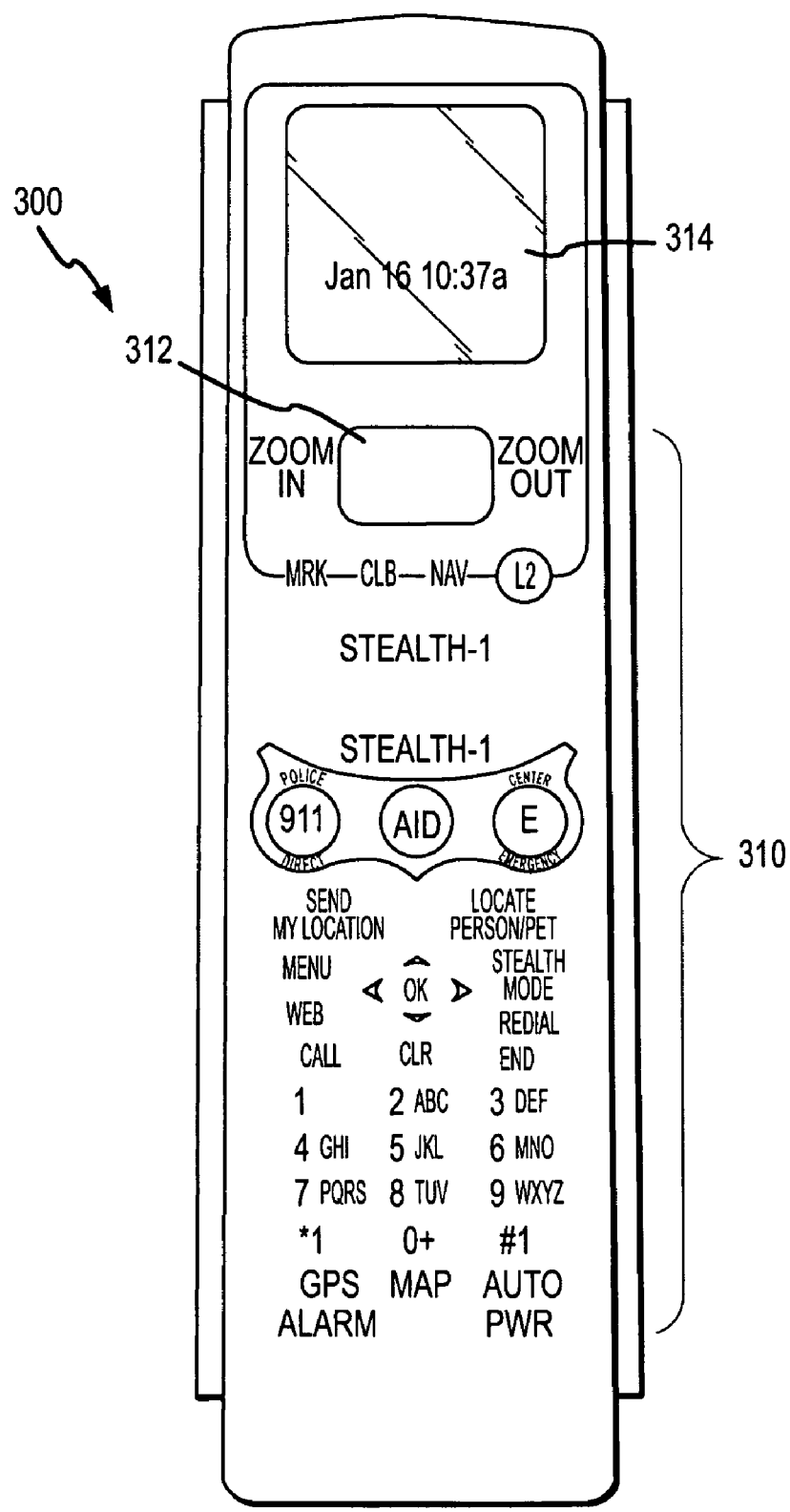

Referring to FIG. 3A, in the present embodiment, a master remote unit 300 according to various aspects of the present invention comprises a flip-open or clamshell style casing, although the master remote unit 300 may be configured in any suitable manner. The user interface 214 includes a keypad 310, a speaker 312, and a display 314. The speaker 312 suitably comprises a conventional speaker for conveying audio signals or other system for generating sound. The display 314 comprises any suitable system for displaying visual information, such as a conventional liquid crystal display. The keypad 310 comprises an array of buttons having various functions, including a numeric keypad and various specialty keys. The master remote unit 300 may also be equipped with any other desired features, such as a mirror (not shown) that may be used as a signal mirror, a vanity mirror, or any other desired purpose. In addition, the master remote unit or other remote units 112 may include decorative features, such as an interchangeable faceplate 332 (see FIG. 3C). The faceplate 332 may be configured to receive favorite pictures, designs, or the like.

In the present embodiment, the input interface 216 facilitates activation of selected special functions, for example via selected buttons or voice commands. Button, switches, dials, or other controls may be positioned in any suitable location on the master remote unit 300, such as on the front and sides. The special functions may include any appropriate functions for assisting the user and/or providing information to the communication center 110. For example, the special functions may include requesting law enforcement emergency assistance, requesting service center emergency assistance, requesting non-emergency assistance, sending position data to a different remote unit 112 or other system, requesting location data from another remote unit 112, activating a monitoring mode, or activating an alarm.

The communication system 100 may also operate using different types of remote units 112 having different functions. For example, in the present embodiment, the communication system 100 may include a hierarchy of remote units 112 such that each level of the hierarchy corresponds to different functions. In the present embodiment, a master remote unit 112A may be configured with a full complement of functions, including assistance request functions, tracking functions, secure communication functions, and data communication functions. Secondary remote units 112B, C are configured for restricted functionality according to their level in the hierarchy. For example, a secondary remote unit 112B may be configured with assistance request functions, but restricted tracking functions or none at all.

In one embodiment, the communication system 100 is configured for family use having a master remote unit 112A, for example for a parent, and various secondary remote units 112B, C, such as an adolescent remote unit, a child remote unit, and a pet remote unit. Each of the secondary remote units 112B, C is suitably configured with functions adapted for the particular intended user. For example, the adolescent remote unit 112B may include full cellular communication functions and assistance request functions, but restricted or no tracking functions. The child remote unit 112C may have its cellular communication functions limited to selected numbers, such as parent or guardian contact numbers and school contact numbers, and include assistance request functions. The pet remote unit may be configured to omit all cellular dialing functions, but may respond automatically to calls to provide tracking information to a master remote unit. The master and secondary remote units may be configured, however, according to the particular application, such as for technical field forces, sales forces, trucking, outdoor sports such as hiking, climbing, fishing, boating, flying, hunting, cycling, and the like. Each remote unit 112 may be configured with one or more selected other functions, for example functions associated with conventional cellular telephones, such as cellular communications, numeric dialing, power activation, redialing, ring control, menu listing, and other control functions.

The various remote units 112 may be configured in any suitable manner to perform desired functions. The master remote unit suitably provides various functions that allow the user to control, track, contact, or otherwise control communications with and operations of the various remote units 112. Referring still to FIG. 3A, an exemplary master remote unit 300 of the present embodiment for a parent may perform various functions, such as for tracking other remote units 112 for children and/or pets, contacting the communication center 110, or contacting authorities. The present master remote unit 300 includes dedicated buttons for one or more of the various functions, though the functions may be implemented according to any suitable activation process, such as voice activation, activation via menus, combinations of numeric buttons, and the like.

In the present embodiment, the master remote unit 300 has several capabilities that distinguish the master remote unit 300 from one or more of the secondary remote units, such as a LOCATE SECONDARY UNIT function to determine the position of selected secondary units, a SEND REMOTE UNIT LOCATION function for transmitting the location data for a secondary remote unit to a third party, an encrypted voice and data communication function, a location mapping function, speaker phone, and/or other functions. The master remote unit 300 may be configured, however, with any appropriate functions, for example functions corresponding to a higher level in a hierarchy or organization. The master remote unit 300 may also be configured, for example at the user's option, to selectively allow tracking of the master remote unit 300, such as by the communication center 110, other remote units 112, third parties, and the like. Thus, if the user wishes to allow tracking of the master remote unit 300, such as to allow tracking by emergency personnel, the feature may be enabled. The user may, however, disable the tracking function to maintain privacy.

In the present embodiment, secondary remote units 112 may include specialty units, such as adolescent, child, and pet units. The specialty units operate in conjunction with the master remote unit 300 and suitably respond to the master remote unit 300 and/or the communication center 110. The secondary units may have any appropriate functions according to the intended user and/or the remote unit's position in the hierarchy or organization. For example, the secondary units may be configured such that the master remote unit 300 may always track the secondary units, and the tracking response by the secondary unit may only be disabled with the authorization of the master remote unit. In addition, the secondary units may be configured with limited functions, such as limiting dialing to selected numbers or eliminating the ability to track other unit, and/or may be configured with additional functions, such as a direct RF connection to the master remote unit 300.

For example, referring to FIG. 3B and 3C, an adolescent remote unit 330 according to various aspects of the present invention comprises a cellular telephone having a limited number of functions relative to the master remote unit 300. In particular, the adolescent remote unit 330 may be configured with various functions, including full-capability cellular communications, assistance request functions, a monitoring mode for receiving tracking requests, and a send unit location function.

The adolescent remote unit 330 may also be configured to respond to tracking requests, for example from the master remote unit 300 or, if authorized, the communication center 110. The tracking request response function is suitably configured so that it cannot be disabled without authorization from the master remote unit 300 or authorized personnel. For younger users, the adolescent remote unit 330 may be locked in a closed position, for example using a thumb-wheel lock 334, to further limit the functions of the adolescent remote unit 330.

Figure 3D:
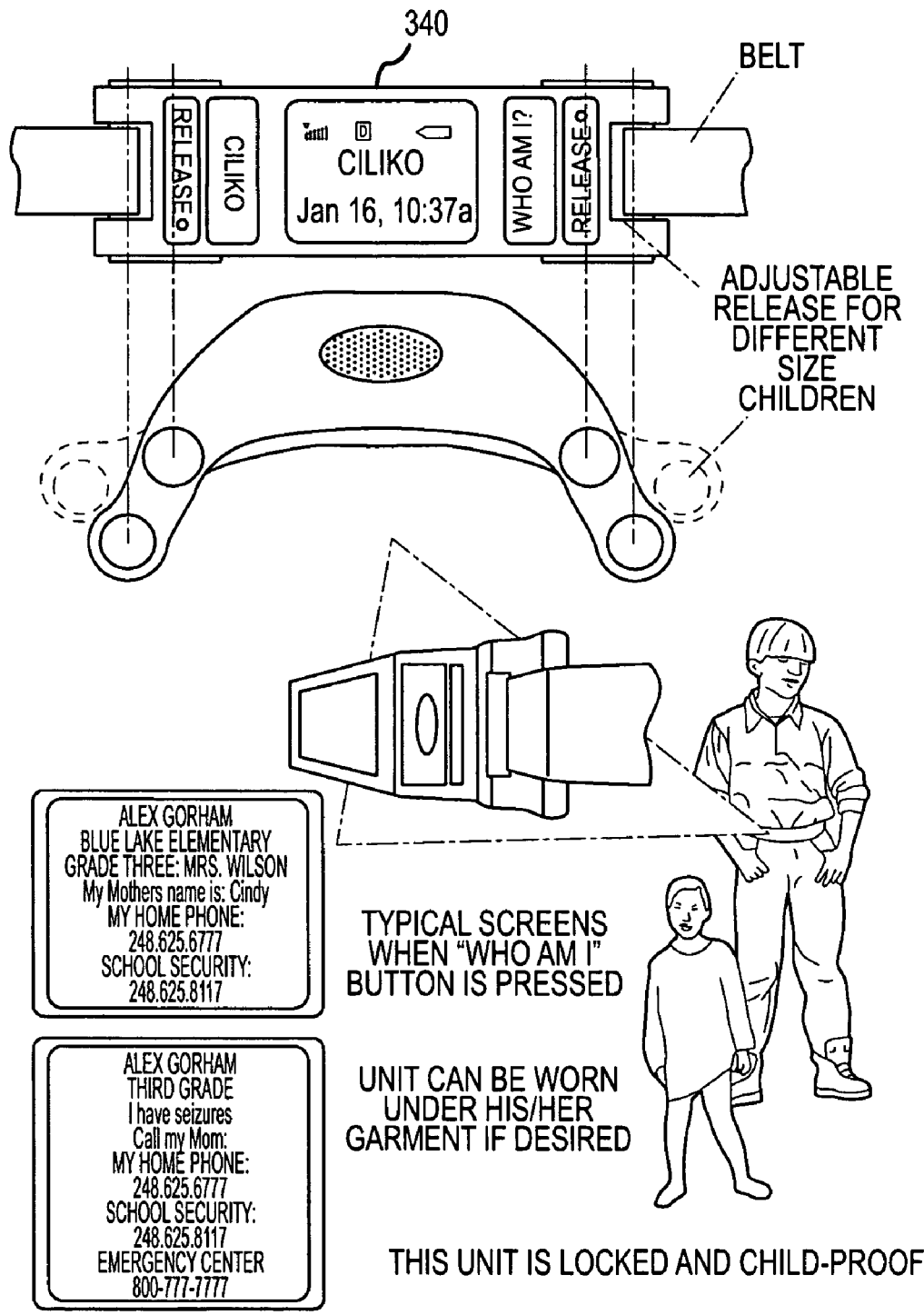

Referring to FIG. 3D, a child remote unit 340 is suitably configured to allow the child remote unit 340 to be tracked by the master remote unit 300 and to provide selected information to third parties. The child remote unit 340 is suitably configured to be attached to the child's clothing or accessories, such as a backpack or belt. The child remote unit 340 may include a remote communication system for making connections, such as cellular connections with the master remote unit 300 and/or the communication center 110 to facilitate location tracking. The child remote unit 340 may also be configured with a display or nameplate providing identification, medical, contact, and other information. An electronic display containing such information may be activated by a third party or the child, such as by depressing a large dedicated button.

The various functions for the child remote unit 340 may be configured particularly for use by children within a selected age group or for others that may require supervision or monitoring, such as an elderly or infirm person. For example, the child remote unit 340 may be configured to allow telephone calls only to selected telephone numbers, such as telephone numbers for parents, school authorities, and/or emergency services, for example via a set of auto-dialing options. The auto-dialing functions may be pre-programmed, such as 9-1-1 for emergencies, programmable by authorized personnel, such as the parent, or any appropriate combination. The child remote unit 340 is suitably configured to allow tracking by a corresponding master remote unit 300, such as a parent's master remote unit, but may not have any ability to track other remote units.

Similarly, referring to FIG. 3E, a pet remote unit 350 is suitably configured to attach to a pet, for example to the pet's collar or the like. The pet remote unit 350 may include a remote communications system for making remote connections, such as with the master remote unit 300 and/or the communication center 110 to facilitate location tracking. The pet remote unit 350 may also be configured with a speaker so that the master control unit 300 user may contact the pet remote unit 350 and provide vocal contact to the pet. The pet remote unit 350 may also be configured with a display or nameplate providing identification, medical, contact, and other information.

The particular functions accorded to the various remote units 112 may be selected according to the particular application and anticipated user. The various remote units 112 may be selectively configured with additional functions, such as a speaker, a GPS receiver and mapping system, zoom and navigation functions for the display, a second line switch, and a web browser. The remote units 112 may also be configured to request and receive downloads, for example to acquire new functions, correct defects, improve performance, and the like. In addition, the remote units 112 may be configured to be connected to networks, such as a Wi-Fi network or other data networks, using any appropriate communication technology, such as Bluetooth or the like. Networking capabilities may also be configured to connect to private networks, for example to facilitate access to corporate files and applications. In addition, the remote units 112 may be configured to operate with a cradle or other hardware connection to interface with a computer, a network, or other system. Further, the remote units 112 may be configured to transform a voice message into text and e-mail the text to an address designated by the user, and may transform text messages received into verbal form for audio playback. The information so transferred may be periodically downloaded and printed and/or electronically stored.

The remote units 112 are suitably configured to perform various assistance request functions. In the present embodiment, the remote unit 112 is configured to allow the user to request non-emergency assistance from an assistance resource, such as the general services center 114. The remote unit 112 may be configured in any suitable manner to request assistance, such as via an automatic dialing function, direct RF exchange, or the like. The remote unit 112 may also be configured to provide its location to facilitate assistance, either automatically or at the user's option.

For example, to request general non-emergency assistance, the user may depress the AID key on the remote unit 112. Referring to FIG. 4, the remote unit 112 suitably activates various components of the remote unit 112, if they are not already activated, such as the positioning system 212, the communications system 210, and any other relevant elements of the remote unit 112 (410). The remote unit 112 then suitably contacts the general services center 114, for example by automatically dialing the relevant contact number (412). The remote unit 112 may also retrieve positional information, such as GPS data from the GPS constellation (414). The remote unit 112 is also suitably configured to prepare data for transmission, such as identification information for the remote unit 112, location data, or other information that may be useful for the general services center 114 (416). When the connection with the general services center 114 is established (418), the information is transmitted to the general services center 114 (420), which may then be used to determine the location of the remote unit 112 and the identity of the user.

The general services center 114 uses the identity information in any suitable manner, for example to retrieve relevant user information from a database, such as the user's name, medical information, contact information, user preferences, preferred language, or other useful information. The general services center 114 may also establish a voice communication with the user, for example to determine the nature of the request. The general services center 114 may then use the retrieved information and/or the position information to assist in fulfilling the user's request, such as to dispatch roadside assistance to repair a vehicle, provide directions to a destination, provide information regarding useful merchants in the area, receive personal messages, obtain traffic information, news, weather forecasts, or emergency alerts, and the like. As the call continues, the remote unit 112 may automatically update the information provided to the general services center 114 (422), such as the positional data, so that the general services center 114 receives substantially current information.

For emergency assistance requests, the user may depress the POLICE 911 DIRECT button and/or the EMERGENCY CENTER button. Referring to FIG. 5, in response to the POLICE 911 DIRECT button activation, the remote unit 112 initiates contact with the local police emergency number. Initially, the remote unit 112 may determine whether enhanced emergency service is available that accepts positional data (510). If only standard emergency service is available, the remote unit 112 initiates a standard police emergency contact (512), such as by automatically dialing 9-1-1. If enhanced emergency service is available, the remote unit 112 retrieves positional data (514), for example via the GPS constellation (514).

The remote unit 112 also suitably prepares relevant information for transmission (516), such as user identification information and position information. The user identification information may comprise any suitable information that may be of interest to the authorities, such as the user's name, address, blood type, and the like. When the connection with the police has been established, the information is transmitted to the police (518) and the user may state the emergency assistance request verbally via the voice connection. The remote unit 112 is suitably configured to update the information transmitted to the police via the data connection (520), such as the positional data to maintain current information.

Referring to FIG. 6, in response to activation of the EMERGENCY CENTER button, the remote unit 112 suitably activates various components of the remote unit 112, if they are not already activated, such as the positioning system 212, the communications system 210, and any other relevant elements of the remote unit 112 (610). The remote unit 112 then suitably contacts the emergency response center 116, for example by automatically dialing the relevant contact number (612). The remote unit 112 also retrieves positional information, such as GPS data from the GPS constellation (614). The remote unit 112 is also suitably configured to prepare data for transmission, such as identification information for the remote unit 112, location data, or other information that may be useful for the emergency response center 116 (616).

When the connection with the emergency response center 116 is established (618), the information is transmitted to the emergency response center 116 (620), which may then be used to determine the location of the remote unit's 112 user and the identity of the user. The emergency response center 116 uses the identity information in any suitable manner, such as to retrieve relevant user information from a database. The general services center 114 may also establish a voice communication with the user, for example to determine the nature of the request. The emergency response center 116 may then use the retrieved information and/or the position information to assist in responding to the emergency, such as to direct the user to a hospital, dispatch emergency services, advise the user how to respond to the emergency, notify local authorities, and the like. As the call continues, the remote unit 112 may automatically update the information provided to the emergency response center 116 (622), such as the positional data, so that the emergency response center 116 receives substantially current information.

The user may also elect to activate an alarm on the remote unit 112 to attract attention and assistance. The remote unit 112 of the present embodiment suitably includes an ALARM key for quick activation of the alarm, or may respond to a voice command. The ALARM button is suitably positioned at a unique position with respect to more commonly used keys, such as at the bottom of the key pad, to avoid unintentional activation. Referring to FIG. 7, in response to activation of the ALARM button or a voice command to activate the alarm, the remote unit 112 may be configured to immediately disable the POWER button (710) so that the remote unit 112 cannot be turned off to silence the alarm. The remote unit 112 may also be configured to request an identification number or code word for activating the alarm (712). If the proper identification number is not entered, the remote unit 112 suitably prompts the user to enter the correct number (716). If the proper identification number is not entered within a selected number of attempts (714) or a selected time period (718, 720), the remote unit 112 may terminate the alarm process and restore functionality to the POWER button (740, 742).

If the proper identification code is entered, the remote unit 112 maintains the cellular communication functions (730) and activates the speaker at the maximum loudness (732). The remote unit 112 then activates an audible alarm (734), such as a siren. In the present embodiment, the alarm comprises a bird's screech, such as a call or help by a parrot or other bird, to attract attention. The remote unit 112 also sets a timer for the duration of the alarm (736). If alarm termination is not requested, the alarm continues until the timer expires (738), at which time the alarm is disabled (740) and the POWER button function is restored (742).

If alarm termination is requested (744), the remote unit 112 awaits entry of the identification number (745). If the proper identification number is provided, the remote unit 112 proceeds with terminating the alarm (740, 742). If the proper identification number is not entered, the remote unit 112 indicates that the number is invalid (746) and continues sounding the alarm (748) until the timer expires or the proper identification number is provided.

The remote unit 112 may also be configured to provide various tracking functions. In the present embodiment, one or more remote units 112 may be configured to allow the user to track the location of other remote units 112. The remote units 112 may be configured in any suitable manner to track other remote units 112 and/or limit tracking of remote units 112, such as by limiting access to location data to authorized users. The remote unit 112 may also be configured to provide tracking information to third parties, such as emergency personnel, either automatically, at the user's option, or at an authorized party's discretion.

For example, a master remote unit 300 may be configured to locate a remote unit 112, such as a remote unit associated with a spouse, child, or pet, and display the location, such as on a map displayed on the display of the master remote unit 300. Referring to FIG. 8, to request the location of another unit, the master remote unit 300 receives a command from the user, such as via a designated button, combination of buttons, or a voice command. The user is then suitably prompted to enter an identifier for the remote unit 112 to be located, such as the particular unit's telephone number. The master remote unit 300 suitably assembles a data signal (810) for requesting the selected remote unit's location and activates the relevant portions of the master remote unit, such as the positioning system 212 and the communications system 210 (812). The master remote unit 300 then contacts the selected remote unit 112, suitably via a cellular telephone connection (814), and verifies the transmission's integrity (816).

The secondary remote unit receives the transmission. The secondary remote unit is suitably configured to selectively, for example according to an election made by the master remote unit 300 user, receive and respond to the transmission without notification, such as a ring or a flashing light. Upon receipt of the information transmission from the master remote unit 300, the communication system 100 is configured to provide the secondary remote unit's position to the master remote unit 300. In the present embodiment, the secondary remote unit responds by verifying authorization of the request, determining its current position and transmitting the position data to the master remote unit 300. For example, referring to FIG. 8B, the secondary remote unit 112 compares the received identification number to one or more stored authorization numbers (818). If the received number does not match any stored numbers, the secondary remote unit suitably provides a notification to the master control unit 300 (820) and terminates the connection (822).

If the request is authorized, the secondary remote unit 112 activates the relevant systems to fulfill the request, such as the positioning system 212 and the remote communication system 210 (824). The secondary remote unit 112 then determines its current position based on GPS data (826) and assembles a data packet comprising any suitable information, such as the position of the secondary remote unit, identification information, current speed and direction of travel, and the like (828). The data packet is then transmitted to the master control unit 300 (830). The secondary remote unit suitably continues to provide updated position information for a selected period or until the connection is terminated (832). When the transmission ends, the secondary remote unit 112 suitably stores a log entry indicating that the location data was requested and transmitted by the master remote unit 300 at the particular date and time (834). The secondary remote unit 112 may then return the relevant systems to their original state (836).

Referring to FIG. 8C, when the master remote unit 300 receives the position data from the secondary remote unit 112, the master remote unit 300 determines whether map data was received with the transmission (838). If not, the master remote unit 300 searches a database, such as an onboard or a remote database, for a map of the relevant location (840). If such a map is not found (842), the master remote unit 300 may display other relevant data that may assist the user, such as a reference point like nearest address or intersection and a distance and direction of the relevant location from the reference point (844).

If a map is received with the position data or is found in the database, the map is displayed along with the relevant location with respect to the map (846). Other information, such as the speed and direction of travel, may also be displayed. The position of the remote unit 112 with respect to the map, as well as the map itself, may be updated over time (847). If the relevant location is beyond the map boundary (848), the map may be eliminated (850). The position data on the display is updated as it is received (852), and the data is stored (854). The master remote unit 300 continues to update the location information until the connection is terminated (856).

A first remote unit 112 may also be configured to voluntarily transmit its location data to a second remote unit, for example by contacting the second remote unit 112 and transmitting the position data. In the present embodiment, the first remote unit 112 may be configured to send its location data to the second remote unit in response to a signal, such as depression of the SEND MY LOCATION button or a voice activation signal. The SEND MY LOCATION request may be accompanied by an identifier for the second remote unit 112, such as a telephone number for the second remote unit 112. Referring to FIG. 9A, the first remote unit 112 suitably activates relevant elements of the remote unit or the full system (910), including the positioning system 212 and the remote communication system 210. The first remote unit 112 identifies its position and prepares a data packet including relevant information, such as identifier information for the first remote unit 112 and the position data (912). The first remote unit 112 then contacts the second remote unit 112, such as via cellular connection, and transmits the data packet (914). The data transmitted may be updated and retransmitted at selected intervals (916). When the connection is terminated (918), the first remote unit may be returned to its original state (920), for example deactivating systems that were originally inactive to reduce power consumption. The connection may be terminated at the same time as a voice connection or may be terminated independently.

The second remote unit 112 may also be suitably configured to receive the position data from the first remote unit and provide the information to the user. Referring to FIG. 9B, the second remote unit 112 responds to the incoming data by fully activating the system or the relevant elements (922). When the data packet is received, the second remote unit 112 displays information relating to the first remote unit's 112 position, such as a map with the location of the first remote unit superimposed on the map (924). The position information provided to the user is updated (926) until the connection terminates (928). The second remote unit 112 may then revert to its original state (930).

A remote unit 112 may also be configured to transmit the location of another remote unit 112 to a third party. For example, a parent may wish to transmit the location of a child's remote unit to a spouse or an emergency unit. The first remote unit 112 is configured to acquire the second remote unit's position and forward the information to the third party. For example, referring to FIG. 10A, the first remote unit 112 may activate the relevant elements to acquire and forward the position data (1010). The first remote unit 112 may then acquire the position data for the second remote unit 112, for example as described above, and generates a corresponding data packet (1012). The first remote unit then forwards the data packet to the third party (1014), for example via a cellular connection or electronic mail, and update the position information until the connection to the third party is terminated (1016). The first remote unit may then return to its original state (1018).

Referring to FIG. 10B, to receive the position data for the second remote unit 112, a third party system, such as a third remote unit 112 or a system associated with the communication center 110, is activated (1020). The received position data is then provided to the third party, for example via a map having the relevant position superimposed on a display (1022). The information may be updated (1024) and stored (1026) until the connection is terminated (1028), at which time the third party system may revert to an original state (1030).

The remote units 112 may also be configured for secure communications functions. For example, a remote unit 112 may be configured with a silent response system so that positional data may be downloaded from the remote unit without the knowledge of the user or those nearby. For example, referring to FIG. 11, a remote unit 112 may be configured to enter into the silent response mode upon a signal, such as depression of the STEALTH button or a voice command. The remote unit 112 then enters a power-saving or monitoring mode by terminating nonessential functions (1110). A timer is then suitably set such that selected functions, such as the call receiving function, is activated at intervals (1112). At the expiration of the timer, the remote unit 112 activates the selected functions (1114) and monitors the relevant frequencies for a connection request (1116). If no connection request is received, the timer is reset. If a connection request is received, the remote unit 112 receives a data packet from the source of the call. If the data packet does not include an appropriate authorization, such as an authorization code from an authorized mater remote unit 300, the attempt may be logged in the remote unit's 112 memory (1120) and a message to the source of the request may be supplied indicating that the request was denied (1122). The connection may then be terminated (1124).

If a proper authorization code is received, the connection request is granted and the remote unit 112 is activated (1126). The remote unit 112 then determines its current position (1128) and creates a corresponding data packet (1130). The data packet is then transmitted to the requesting unit (1132) and updated (1134) until the connection is terminated (1136). Upon termination, the instance of the connection may be logged in the remote unit's 112 memory.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The present invention has been described above with reference to a preferred embodiment. However, changes and modifications may be made to the preferred embodiment without departing from the scope of the present invention. These and other changes or modifications are intended to be included within the scope of the present invention.

The invention claimed is:

1. A mobile telephony communication system for use by multiple users, the system comprising:
 a first mobile telephony unit configured to be carried by a person and configured to transmit and receive wireless telephony communications; and
 a second mobile telephony unit configured to be carried by at least one of a person and a pet and configured to transmit first location information toward the first mobile telephony unit;
 wherein the first unit is further configured to receive second location information related to the first location information from the second unit and to display, to a user of the first mobile telephony unit, indicia of the second location information;
 wherein at least one of the first and second mobile telephony units is configured such that the second unit is unable to automatically track a location of the first unit upon request; and
 wherein the second unit is configured to initiate outgoing telecommunications with a limited set of destinations that includes a telephone number stored in the second unit by the first unit.

2. The system of claim 1 wherein the second unit is unable to request to track a location of the first unit.

3. The system of claim 1 wherein the limited set of destinations includes the first unit and at least one emergency destination.

4. The system of claim 3 wherein the at least one emergency destination includes a 911 emergency number.

5. The system of claim 1 wherein the second unit is configured to be worn by a pet and is configured to receive incoming telephone calls and provide audio associated with the incoming calls but is unable to initiate outgoing telephone calls.

6. The system of claim 1 wherein the second unit is configured to provide information regarding a user associated with the second unit in response to a user identity request received locally by the second unit.

* * * * *

UNITED STATES PATENT AND TRADEMARK OFFICE
CERTIFICATE OF CORRECTION

| | |
|---|---|
| PATENT NO. | : 7,068,994 B2 |
| APPLICATION NO. | : 10/637987 |
| DATED | : June 27, 2006 |
| INVENTOR(S) | : R. Allen Van Camp |

It is certified that error appears in the above-identified patent and that said Letters Patent is hereby corrected as shown below:

Title Page, Item (73) Assignee, replace "Clarkson" with --Clarkston--.

Signed and Sealed this

Twelfth Day of September, 2006

JON W. DUDAS
*Director of the United States Patent and Trademark Office*